(12) United States Patent
Bosworth

(10) Patent No.: US 8,509,992 B1
(45) Date of Patent: Aug. 13, 2013

(54) VEHICLE BATTERY RECHARGING SYSTEM AND ASSOCIATED METHOD

(76) Inventor: Judson Bosworth, Northridge, CA (US)

( * ) Notice: Subject to any disclaimer, the term of this patent is extended or adjusted under 35 U.S.C. 154(b) by 298 days.

(21) Appl. No.: 12/943,524

(22) Filed: Nov. 10, 2010

Related U.S. Application Data

(60) Provisional application No. 61/259,696, filed on Nov. 10, 2009.

(51) Int. Cl.
   *H02J 7/32* (2006.01)
(52) U.S. Cl.
   USPC ............................................. 701/36; 320/101
(58) Field of Classification Search
   None
   See application file for complete search history.

(56) References Cited

U.S. PATENT DOCUMENTS

| | | | |
|---|---|---|---|
| 3,878,913 A | 4/1975 | Lionts | |
| 4,075,545 A * | 2/1978 | Haberer | 322/35 |
| 5,415,134 A | 5/1995 | Stewart | |
| 5,680,032 A * | 10/1997 | Pena | 290/52 |
| 5,917,304 A | 6/1999 | Bird | |
| 8,098,040 B1* | 1/2012 | Botto | 320/101 |
| 2002/0066608 A1* | 6/2002 | Guenard et al. | 180/65.3 |
| 2004/0026930 A1 | 2/2004 | Baggett | |
| 2008/0315827 A1* | 12/2008 | Massey | 320/101 |
| 2010/0181780 A1* | 7/2010 | Gillett | 290/1 R |

* cited by examiner

*Primary Examiner* — Michael J Zanelli

(57) ABSTRACT

A vehicle electric power generating system may include an alternator communicatively coupled to a wind driven turbine and to the existing vehicle battery. A belt may be rotatably coupled to the alternator and the wind driven turbine respectively. A controller may be communicatively coupled to the alternator to automatically regulate the power transfer rate of the alternator. A plurality of sensors may be communicatively coupled to the controller and may be communicatively coupled to the existing vehicle battery as well as an existing vehicle electric motor. First and second switches may be intermediately coupled between the existing vehicle battery and the controller as well as the existing vehicle electrical motor and the controller respectively. Upon synchronous rotation of the wind driven turbine and the belt respectively, the alternator generates an electrical power output adapted to charge the existing vehicle battery.

12 Claims, 3 Drawing Sheets

VEHICLE BATTERY RECHARGING SYSTEM AND ASSOCIATED METHOD

CROSS REFERENCE TO RELATED APPLICATIONS

This application claims the benefit of U.S. Provisional Application No. 61/259,696, filed Nov. 10, 2009, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to electric and hybrid vehicles and, more particularly, to a vehicle battery recharging system for providing users with an effective mechanism for recharging a vehicle's battery using wind energy.

2. Prior Art

In 1820, the Danish physicist Hans Christian Oersted discovered that electricity can produce magnetic fields. Oersted's discovery unified the study of electricity and magnetism and resulted in such practical applications as the electromagnet, the telegraph, and the electric motor. In 1831, British physicist Michael Faraday demonstrated the reciprocal effect—that moving magnets induce electricity. Faraday's discovery provided the principle for electric power generation. In a simple generator, a coil of conducting wire is placed between two magnets and spun, inducing an electric current. The generator's alternating current, in which electrons move back and forth, differs from a battery's direct current in which electrons always flow in one direction, from negative to positive.

In the contemporary world, generators range from the huge hydroelectric turbines that power cities to the gas-powered emergency generators that consumers use during power outages, to the alternators in our cars—which generate alternating current and then convert it to direct current to maintain the charge in our car batteries.

All generators depend on a motive force to spin either their coils or their magnets. The force of flowing water rotates the fins in a hydroelectric turbine, and a revolving shaft in turn rotates the coils; gas-powered generators use an internal combustion engine and a driveshaft t produce rotation; and the electromagnets in a car's alternator are spun by a driveshaft connected to a belt driven by the engine. Thus, to generate electricity, a generator requires an input of kinetic, or mechanical, energy. That energy may be provided by the gravitational potential of water stored behind a dam; by a gasoline motor; by the steam-driven turbines of a coal or nuclear plant, or by the wind.

In a hybrid or electric vehicle, a big battery bank stores sufficient electrical energy for the vehicle to travel for a specific designed mileage. Thereafter, the battery must be recharged in order to retain the energy level in order to drive the vehicle transmission and wheels. Usually, the batteries may be recharged at recharging stations which may be located at a distance from the vehicle. Therefore, a battery or charging system which can retain a vehicle's battery's energy for a longer mileage is one of the issues which the electric car designer has to grapple with.

Accordingly, a need remains for system in order to overcome the above-noted shortcomings. The present invention satisfies such a need by providing a vehicle battery recharging system that is convenient and easy to use, lightweight yet durable in design, versatile in its applications, and designed for providing users with an effective mechanism for recharging a vehicle's battery using wind energy.

BRIEF SUMMARY OF THE INVENTION

In view of the foregoing background, it is therefore an object of the present invention to provide a vehicle electric power generating system for charging an existing vehicle battery during driving conditions. These and other objects, features, and advantages of the invention are provided by a vehicle electric power generating system including a stationary air intake scoop positioned at an existing front air grill of an existing vehicle, a rotating wind driven turbine communicatively coupled to the air intake scoop and preferably located downstream therefrom.

The vehicle electric power generating system may further include an alternator communicatively coupled to the wind driven turbine. Such an alternator may be communicatively coupled to the existing vehicle battery. Further, a belt may be rotatably coupled to the alternator and the wind driven turbine respectively. Notably, upon synchronous rotation of the wind driven turbine and the belt respectively, the alternator advantageously generates an electrical power output adapted to charge the existing vehicle battery. Such an arrangement provides the unexpected and unpredictable advantage of making use of the air draft generated by the travelling vehicle. This source of readily available and free wind energy may be utilized to charge the existing vehicle battery without the need to use an alternative and costly energy source. The system further allows the vehicle battery to be constantly charged during driving operations without having to stop the vehicle at charging stations to either recharge or to exchange for another fully charged battery.

In a non-limiting exemplary embodiment, a power transfer rate of the electrical power output may be directly commensurate with a rotational speed of the wind driven turbine.

In a non-limiting exemplary embodiment, a power transfer rate of the electrical power output may be directly commensurate with a rotational speed of the belt.

In a non-limiting exemplary embodiment, a controller may be communicatively coupled to the alternator. Such a controller may automatically regulate the power transfer rate of the alternator. A plurality of sensors may be communicatively coupled to the controller wherein such sensors may be communicatively coupled to the existing vehicle battery as well as an existing vehicle electric motor. Advantageously, the sensors are capable of detecting a power consumption rate of the existing vehicle battery and the existing vehicle electric motor respectively. First and second switches may be intermediately coupled between the existing vehicle battery and the controller as well as the existing vehicle electrical motor and the controller respectively. In this manner, the first and second switches are capable of selectively interrupting power to the existing vehicle battery and electrical motor respectively. Such an arrangement provides the unexpected and unpredictable advantage of ensuring that the system is automatically and safely regulated and maintained within its charging limits to prevent overheating and damage to the vehicle battery.

In a non-limiting exemplary embodiment, the controller preferably includes a processor communicatively coupled to the sensors, and a memory communicatively coupled to the processor. Such a memory preferably includes software instructions defining a control logic algorithm executable by the processor for automatically controlling transfer of the electrical power output from the alternator to the existing vehicle battery and electrical motor respectively. Such an arrangement provides the unexpected and unpredictable advantage of regulating the electrical power output from the alternator when the vehicle has to be driven at varying speeds on highways and city roads.

In a non-limiting exemplary embodiment, the control logic algorithm preferably includes the chronological steps of: detecting a real time remaining electrical power level of the existing vehicle battery; determining whether the remaining electrical power level is above a predefined maximum electrical power threshold level; if the real time remaining electrical power level is greater than the predefined maximum electrical power threshold level, then toggling the first switch to an open position and toggling the second switch to a closed position; and if the real time remaining electrical power level is lower than the predefined maximum electrical power threshold level, then toggling the first switch to a closed position and toggling the second switch to an open position. Such an arrangement provides the unexpected and unpredictable advantage of automatically regulating and maintaining the charge on the battery to prevent battery overvoltage and thus overheating during the charging operations.

In a non-limiting exemplary embodiment, the wind driven turbine may include a rotating cylindrical drum preferably having a centrally registered fulcrum axis extending along a longitudinal axis of the drum. Such a drum may be oriented along a plane parallel relative to a ground surface on which the existing vehicle travels.

In a non-limiting exemplary embodiment, the wind driven turbine may include a plurality of curvilinear blades each may have a longitudinal length greater a width of the air intake scoop. Notably, a lower hemisphere of the drum traverses a centrally registered longitudinal axis of the air intake scoop such that air entering the air intake scoop causes the curvilinear blades to rotate along a first rotational path and thereby drive the belt along a corresponding second rotational path. In this way, the direct impact of the airflow will transmit the force of the air draft with minimum loss of energy to the turbine blades. Such a structural arrangement provides the unexpected and unpredictable advantage of drawing the maximum energy of the air flow from the vehicle to turn the turbine blades in the most efficient way possible.

In a non-limiting exemplary embodiment, the air intake scoop and wind driven turbine may be positioned under a hood section of the existing vehicle respectively.

In a non-limiting exemplary embodiment, the alternator may be located within the hood section of the existing vehicle and coupled to an existing electric motor of the existing vehicle, respectively.

Such an arrangement of placing the air intake scoop, wind driven turbine and alternator within the hood section of the existing vehicle provides the unexpected and unpredictable advantage of allowing the system to be integrated into new vehicle models as well as existing ones. In this way, the system can be integrally assembled into new vehicles as well as be retrofitted in existing ones thereby providing a longer useful life for the older electric vehicles.

The present disclosure may further include a method of utilizing a vehicle electric power generating system for charging an existing vehicle battery during driving conditions. Such a method preferably includes the chronological steps of: providing and positioning a stationary air intake scoop at an existing front air grill of an existing vehicle; providing and communicatively coupling a rotating wind driven turbine to the air intake scoop; locating the wind driven turbine downstream from the air intake scoop; and providing and communicatively coupling an alternator to the wind driven turbine.

The method may further include the chronological steps of: communicatively coupling the alternator to the existing vehicle battery; providing and rotatably coupling a belt to the alternator and the wind driven turbine respectively; and causing air to enter the air intake scoop and thereby synchronously rotate the wind driven turbine and the belt. In this manner, upon synchronous rotation of the wind driven turbine and the belt respectively, the alternator generating an electrical power output adapted to charge the existing vehicle battery.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1:
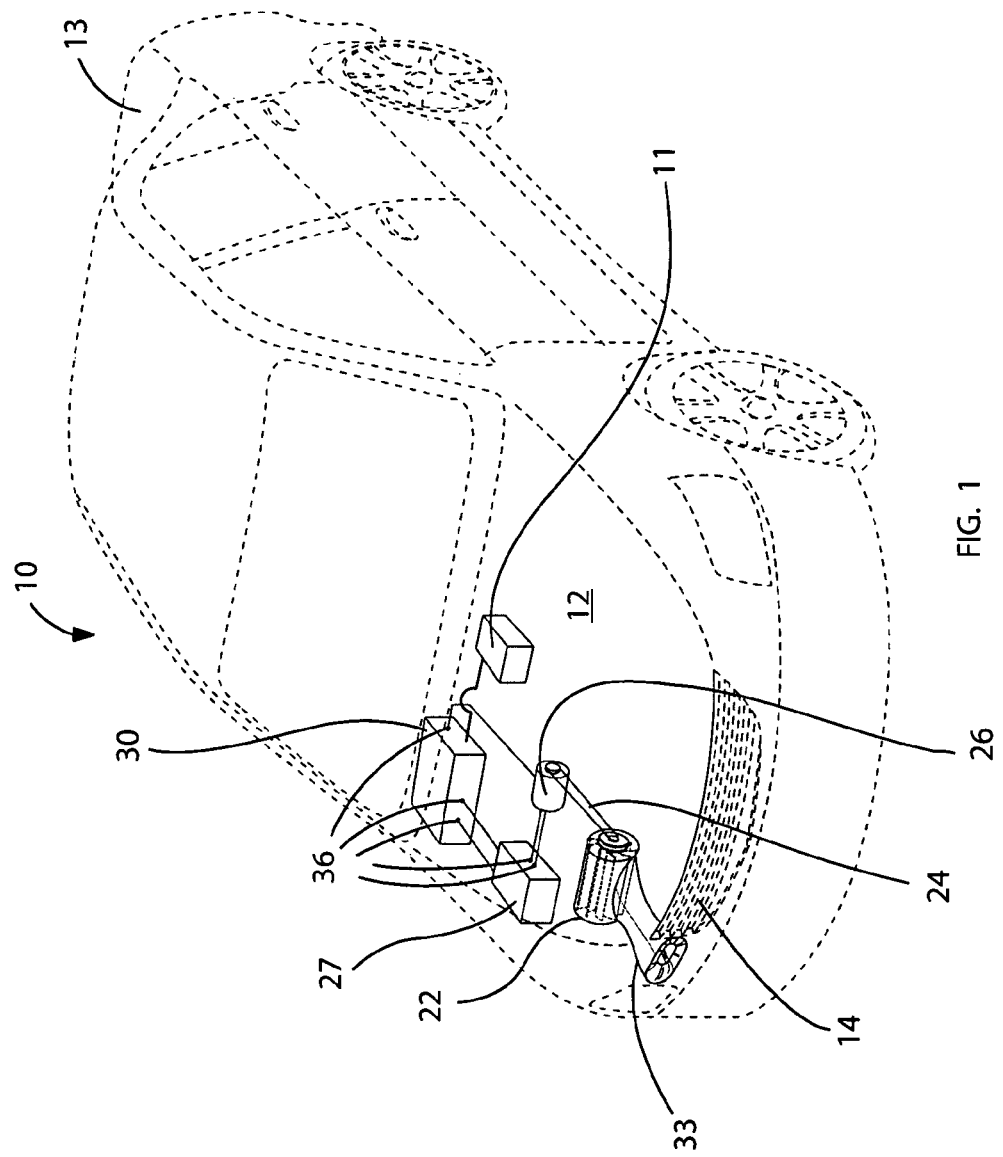
FIG. 1 is a schematic view showing a vehicle electric power generating system employed in a preferred environment, in accordance with the present invention.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The illustrations of the embodiments described herein are intended to provide a general understanding of the structure of the various embodiments. The illustrations are not intended to serve as a complete description of all of the elements and features of system and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "present invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The below disclosed subject matter is to be considered illustrative, and not restrictive, and the appended claims are intended to cover all such modifications, enhancements, and other embodiments which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The system of this invention is referred to generally in FIGS. 1-4 by the reference numeral 10 and is intended to provide a vehicle electric power generating system. It should be understood that the vehicle electric power generating system 10 may be used to charge an existing vehicle battery during driving conditions of many different types of vehicles.

Referring to FIGS. 1-4, the vehicle electric power generating system 10 preferably includes a stationary air intake scoop 33 positioned at an existing front air grill of an existing vehicle 13, a rotating wind driven turbine 22 communicatively coupled to the air intake scoop 33 and preferably located downstream therefrom. The vehicle electric power generating system 10 may further include an alternator 26 communicatively coupled to the wind driven turbine 22. Such an alternator 26 may be communicatively coupled to the existing vehicle battery 11. Further, a belt 24 may be rotatably coupled to the alternator 26 and the wind driven turbine 22 respectively. Notably, upon synchronous rotation of the wind driven turbine 22 and the belt 24 respectively, the alternator 26 advantageously generates an electrical power output adapted to charge the existing vehicle battery 11. Such an arrangement provides the unexpected and unpredictable advantage of making use of the air draft generated by the travelling vehicle 13. This source of readily available and free wind energy may be utilized to charge the existing vehicle battery 11 without the need to use an alternative and costly energy source. The system 10 further allows the vehicle battery 11 to be constantly charged during driving operations without having to stop the vehicle 13 at charging stations to either recharge or to exchange for another fully charged battery.

In a non-limiting exemplary embodiment, a power transfer rate of the electrical power output may be directly commensurate with a rotational speed of the wind driven turbine 22.

In a non-limiting exemplary embodiment, a power transfer rate of the electrical power output may be directly commensurate with a rotational speed of the belt 24.

Figure 4:
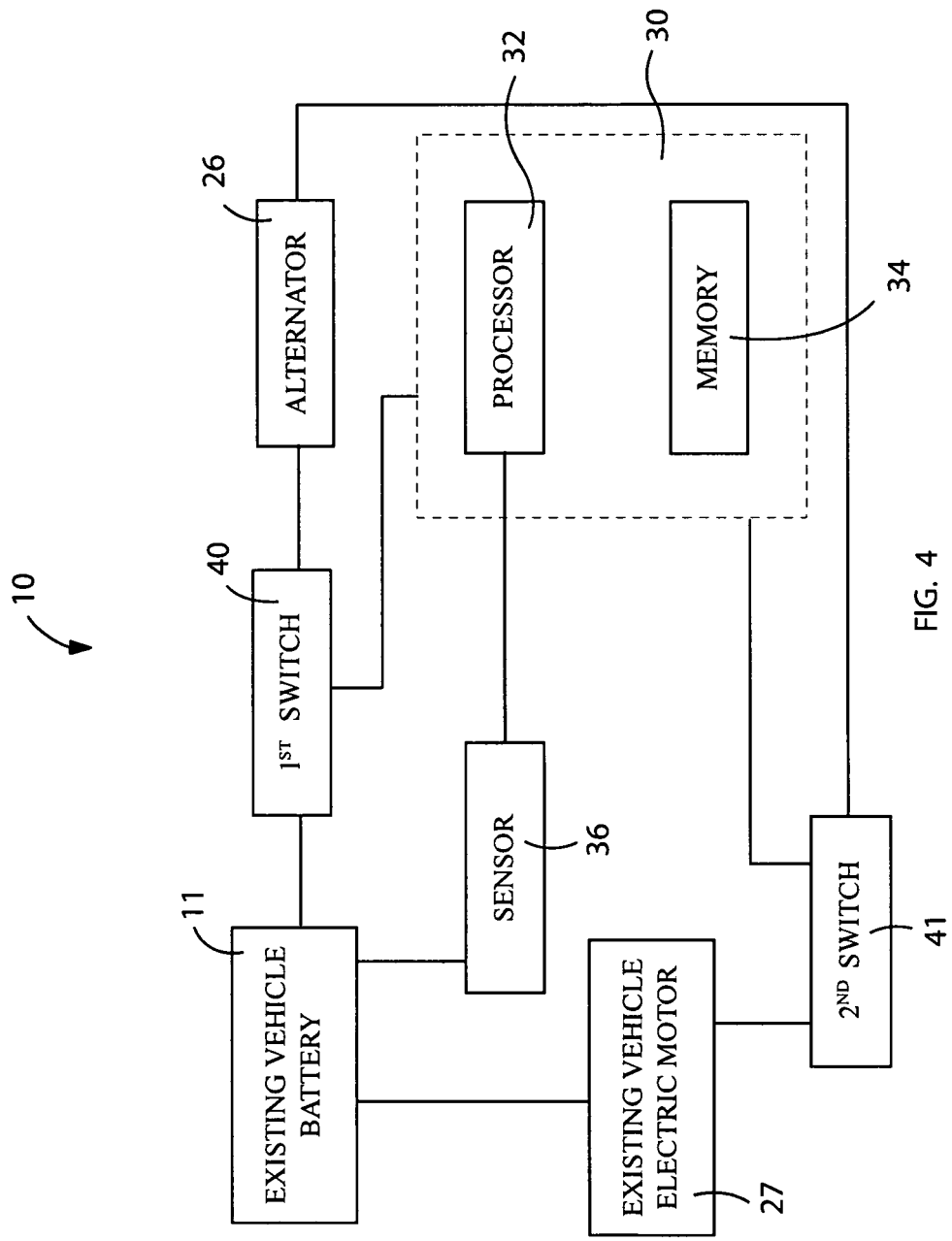
FIG. 4 is a high-level schematic block diagram showing the interrelationship between the major electronic components of the present invention.

Referring to FIG. 4 in detail, in a non-limiting exemplary embodiment, a controller 30 may be communicatively coupled to the alternator 26. Such a controller 30 may automatically regulate the power transfer rate of the alternator 26. A plurality of sensors 36 may be communicatively coupled to the controller 30 wherein such sensors 36 may be communicatively coupled to the existing vehicle battery 11 as well as an existing vehicle electric motor 27. Advantageously, the sensors 36 are capable of detecting a power consumption rate of the existing vehicle battery 11 and the existing vehicle electric motor 27 respectively. Such sensors 36 are well known in the art and function in a manner well known in the industry. First and second switches 40, 41 may be intermediately coupled between the existing vehicle battery 11 and the controller 30 as well as the existing vehicle electrical motor 27 and the controller 30 respectively. In this manner, the first and second switches 40, 41 are capable of selectively interrupting power to the existing vehicle battery 11 and electrical motor 27 respectively. Such an arrangement provides the unexpected and unpredictable advantage of ensuring that the system 10 is automatically and safely regulated and maintained within its charging limits to prevent overheating and damage to the vehicle battery 11.

Again referring to FIG. 4, in a non-limiting exemplary embodiment, the controller 30 preferably includes a processor 32 communicatively coupled to the sensors 36, and a memory 34 communicatively coupled to the processor 32. Such a memory 34 preferably includes software instructions defining a control logic algorithm executable by the processor 32 for automatically controlling transfer of the electrical power output from the alternator 26 to the existing vehicle battery 11 and electrical motor 27 respectively. Such an arrangement provides the unexpected and unpredictable advantage of regulating the electrical power output from the alternator 26 when the vehicle 13 has to be driven at varying speeds on highways and city roads.

In a non-limiting exemplary embodiment, the control logic algorithm preferably includes the chronological steps of: detecting a real time remaining electrical power level of the existing vehicle battery 11; determining whether the remaining electrical power level is above a predefined maximum electrical power threshold level; if the real time remaining electrical power level is greater than the predefined maximum electrical power threshold level, then toggling the first switch 40 to an open position and toggling the second switch 41 to a closed position; and if the real time remaining electrical power level is lower than the predefined maximum electrical power threshold level, then toggling the first switch 40 to a closed position and toggling the second switch 41 to an open position. Such an arrangement provides the unexpected and unpredictable advantage of automatically regulating and maintaining the charge on the battery 11 to prevent battery overvoltage and thus overheating during the charging operations.

Figure 2:
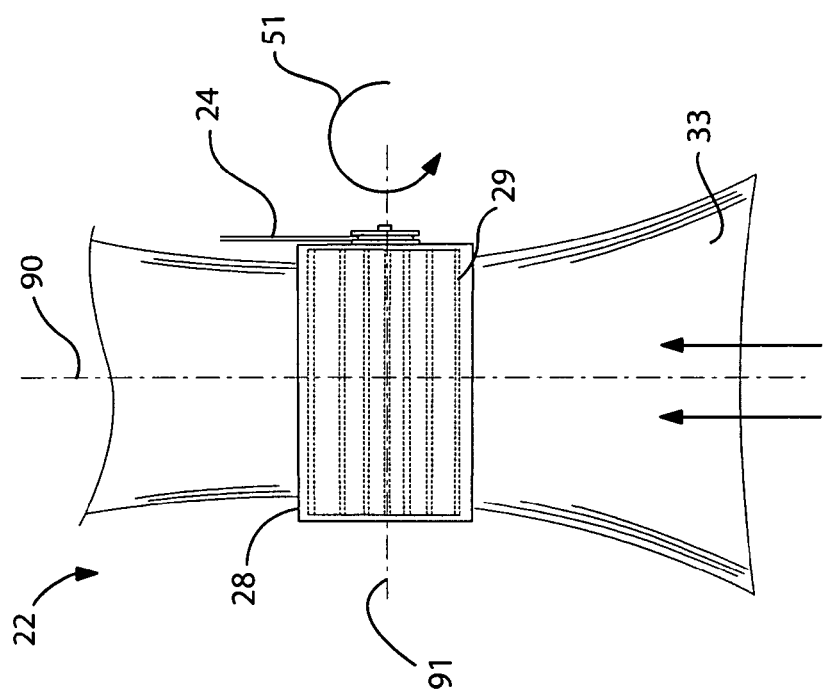
FIG. 2 is a top elevational view of the wind driven turbine and air intake scoop.

Referring to FIG. 2, in a non-limiting exemplary embodiment, the wind driven turbine 22 may include a rotating cylindrical drum 28 preferably having a centrally registered fulcrum axis 90 extending along a longitudinal axis 91 of the drum 28. Such a drum 28 may be oriented along a plane parallel relative to a ground surface on which the existing vehicle 13 travels.

Figure 3:
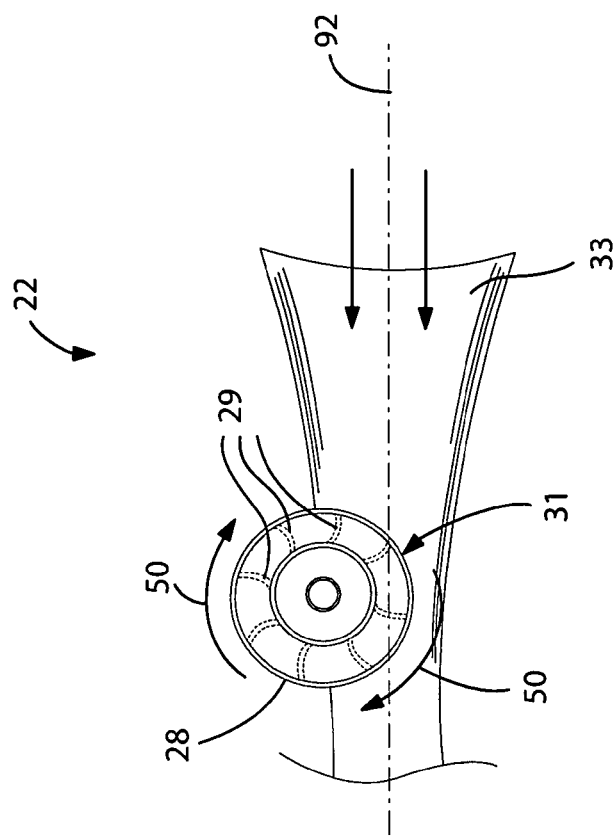
FIG. 3 is a side elevational view of the showing a direction of air flow entering the air intake scoop and thereby driving the wind driven turbine.

As best shown in FIG. 3, in a non-limiting exemplary embodiment, the wind driven turbine 22 may include a plurality of curvilinear blades 29, each having a longitudinal length greater than a width of the air intake scoop 33. Notably, a lower hemisphere 31 of the drum 28 traverses a centrally registered longitudinal axis 92 of the air intake scoop 33 such that air entering the air intake scoop 33 causes the curvilinear blades 29 to rotate along a first rotational path 50 and thereby drive the belt 24 along a corresponding second rotational path 51. In this way, the direct impact of the airflow will transmit the force of the air draft with minimum loss of energy to the turbine blades 29. Such a structural arrangement provides the unexpected and unpredictable advantage of drawing the maximum energy of the air flow from the vehicle 13 to turn the turbine blades 29 in the most efficient way possible.

Referring to FIG. 1, in a non-limiting exemplary embodiment, the air intake scoop 33 and wind driven turbine 22 may be positioned under a hood section 12 of the existing vehicle 13 respectively.

Again, referring to FIG. 1, in a non-limiting exemplary embodiment, the alternator 26 may be located within the hood section 12 of the existing vehicle 13 and coupled to an existing electric motor 27 of the existing vehicle 13, respectively.

Such an arrangement of placing the air intake scoop 33, wind driven turbine 22 and alternator 26 within the hood section 12 of the existing vehicle 13 provides the unexpected and unpredictable advantage of allowing the system 10 to be integrated into new vehicle models as well as existing ones. In this way, the system 10 can be integrally assembled into new vehicles as well as be retrofitted in existing ones thereby providing a longer useful life for the older electric vehicles.

The present disclosure may further include a method of utilizing a vehicle electric power generating system 10 for charging an existing vehicle battery 11 during driving conditions. Such a method preferably includes the chronological steps of: providing and positioning a stationary air intake scoop 33 at an existing front air grill 14 of an existing vehicle 13; providing and communicatively coupling a rotating wind driven turbine 22 to the air intake scoop 33; locating the wind driven turbine 22 downstream from the air intake scoop 33; and providing and communicatively coupling an alternator 26 to the wind driven turbine 22.

The method may further include the chronological steps of: communicatively coupling the alternator 26 to the existing vehicle battery 11; providing and rotatably coupling a belt 24 to the alternator 26 and the wind driven turbine 22 respectively; and causing air to enter the air intake scoop 33 and thereby synchronously rotate the wind driven turbine 22 and the belt 24. In this manner, upon synchronous rotation of the wind driven turbine 22 and the belt 24 respectively, the alternator 26 generating an electrical power output adapted to charge the existing vehicle battery 11.

The combination of such claimed elements provides an unpredictable and unexpected benefit of charging and retaining an electric vehicle's battery energy for a much longer time which solves the problem of having to recharge these batteries constantly at "battery stops" when driving long distances.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention. In particular, with respect to the above description, it is to be realized that the optimum dimensional relationships for the parts of the present invention may include variations in size, materials, shape, form, function and manner of operation.

What is claimed as new and what is desired to secure by Letters Patent of the United States is:

1. A vehicle electric power generating system for charging an existing vehicle battery during driving conditions, said vehicle electric power generating system comprising:
   an air intake scoop capable of being positioned at an existing front air grill of an existing vehicle;
   a wind driven turbine communicatively coupled to said air intake scoop and being located downstream therefrom;
   an alternator communicatively coupled to said wind driven turbine and further capable of being communicatively coupled to the existing vehicle battery;
   a belt coupled to said alternator and said wind driven turbine respectively;
   wherein, upon rotation of said wind driven turbine and said belt respectively, said alternator generates an electrical power output adapted to charge the existing vehicle battery;
   wherein a power transfer rate of said electrical power output is directly commensurate with a rotational speed of said wind driven turbine;
   a controller communicatively coupled to said alternator, said controller being capable of automatically regulating said power transfer rate of said alternator;
   a plurality of sensors communicatively coupled to said controller, said sensors adapted to be communicatively coupled to the existing vehicle battery as well as an existing vehicle electric motor, said sensors being capable of detecting a power consumption rate of the existing vehicle battery and the existing vehicle electric motor respectively; and
   first and second switches adapted to be intermediately coupled between the existing vehicle battery and said controller as well as the existing vehicle electrical motor and said controller respectively;
   wherein said first and second switches are capable of selectively interrupting power to the existing vehicle battery and electrical motor respectively.

2. The vehicle electric power generating system of claim 1, wherein said controller comprises:
   a processor communicatively coupled to said sensors; and a memory communicatively coupled to said processor, said memory including software instructions defining a control logic algorithm executable by said processor for automatically controlling transfer of said electrical power output from said alternator to the existing vehicle battery and electrical motor respectively;

wherein said control logic algorithm comprises the chronological steps of:
  detecting a real time remaining electrical power level of the existing vehicle battery,
  determining whether said remaining electrical power level is above a predefined maximum electrical power threshold level,
  if said real time remaining electrical power level is greater than said predefined maximum electrical power threshold level, then toggling said first switch to an open position and toggling said second switch to a closed position, and
  if said real time remaining electrical power level is lower than said predefined maximum electrical power threshold level, then toggling said first switch to a closed position and toggling said second switch to an open position.

3. The vehicle electric power generating system of claim 1, wherein said wind driven turbine comprises: a rotating cylindrical drum having a centrally registered fulcrum axis extending along a longitudinal axis of said drum, said drum being oriented along a plane parallel relative to a ground surface on which the existing vehicle travels.

4. The vehicle electric power generating system of claim 3, wherein said wind driven turbine further comprises: a plurality of curvilinear blades each having a longitudinal length greater a width of said air intake scoop;
  wherein a lower hemisphere of said drum traverses a centrally registered longitudinal axis of said air intake scoop such that air entering said air intake scoop causes said curvilinear blades to rotate along a first rotational path and thereby drive said belt along a corresponding second rotational path.

5. The vehicle electric power generating system of claim 1, wherein said air intake scoop is capable of being positioned under a hood section of the existing vehicle, wherein said wind driven turbine is adapted to be located within the hood section of the existing vehicle.

6. The vehicle electric power generating system of claim 1, wherein said alternator is capable of being located within the hood section of the existing vehicle, wherein said alternator is adapted to be coupled to an existing electric motor of the existing vehicle.

7. A vehicle electric power generating system for charging an existing vehicle battery during driving conditions, said vehicle electric power generating system comprising:
  a stationary air intake scoop capable of being positioned at an existing front air grill of an existing vehicle;
  a rotating wind driven turbine communicatively coupled to said air intake scoop and being located downstream therefrom;
  an alternator communicatively coupled to said wind driven turbine and further capable of being communicatively coupled to the existing vehicle battery;
  a belt rotatably coupled to said alternator and said wind driven turbine respectively;
  wherein, upon synchronous rotation of said wind driven turbine and said belt respectively, said alternator generates an electrical power output adapted to charge the existing vehicle battery;
  wherein a power transfer rate of said electrical power output is directly commensurate with a rotational speed of said belt;
  a controller communicatively coupled to said alternator, said controller being capable of automatically regulating said power transfer rate of said alternator;
  a plurality of sensors communicatively coupled to said controller, said sensors adapted to be communicatively coupled to the existing vehicle battery as well as an existing vehicle electric motor, said sensors being capable of detecting a power consumption rate of the existing vehicle battery and the existing vehicle electric motor respectively; and
  first and second switches adapted to be intermediately coupled between the existing vehicle battery and said controller as well as the existing vehicle electrical motor and said controller respectively;
  wherein said first and second switches are capable of selectively interrupting power to the existing vehicle battery and electrical motor respectively.

8. The vehicle electric power generating system of claim 7, wherein said controller comprises:
  a processor communicatively coupled to said sensors; and
  a memory communicatively coupled to said processor, said memory including software instructions defining a control logic algorithm executable by said processor for automatically controlling transfer of said electrical power output from said alternator to the existing vehicle battery and electrical motor respectively;
  wherein said control logic algorithm comprises the chronological steps of:
    detecting a real time remaining electrical power level of the existing vehicle battery,
    determining whether said remaining electrical power level is above a predefined maximum electrical power threshold level,
    if said real time remaining electrical power level is greater than said predefined maximum electrical power threshold level, then toggling said first switch to an open position and toggling said second switch to a closed position, and
    if said real time remaining electrical power level is lower than said predefined maximum electrical power threshold level, then toggling said first switch to a closed position and toggling said second switch to an open position.

9. The vehicle electric power generating system of claim 7, wherein said wind driven turbine comprises: a rotating cylindrical drum having a centrally registered fulcrum axis extending along a longitudinal axis of said drum, said drum being oriented along a plane parallel relative to a ground surface on which the existing vehicle travels.

10. The vehicle electric power generating system of claim 9, wherein said wind driven turbine further comprises: a plurality of curvilinear blades each having a longitudinal length greater a width of said air intake scoop;
  wherein a lower hemisphere of said drum traverses a centrally registered longitudinal axis of said air intake scoop such that air entering said air intake scoop causes said curvilinear blades to rotate along a first rotational path and thereby drive said belt along a corresponding second rotational path.

11. The vehicle electric power generating system of claim 7, wherein said air intake scoop is capable of being positioned under a hood section of the existing vehicle, wherein said wind driven turbine is adapted to be located within the hood section of the existing vehicle.

12. The vehicle electric power generating system of claim 7, wherein said alternator is capable of being located within the hood section of the existing vehicle, wherein said alternator is adapted to be coupled to an existing electric motor of the existing vehicle.

\* \* \* \* \*